United States Patent
Murakami et al.

(10) Patent No.: US 7,128,952 B2
(45) Date of Patent: *Oct. 31, 2006

(54) OPTICAL FILM

(75) Inventors: Nao Murakami, Ibaraki (JP); Yuuichi Nishikouji, Ibaraki (JP); Masaki Hayashi, Ibaraki (JP); Hiroyuki Yoshimi, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 43 days.

This patent is subject to a terminal disclaimer.

(21) Appl. No.: 10/509,759

(22) PCT Filed: May 21, 2003

(86) PCT No.: PCT/JP03/06322

§ 371 (c)(1),
(2), (4) Date: Sep. 30, 2004

(87) PCT Pub. No.: WO03/100480

PCT Pub. Date: Dec. 4, 2003

(65) Prior Publication Data

US 2005/0231839 A1 Oct. 20, 2005

(30) Foreign Application Priority Data

May 24, 2002 (JP) ............................ 2002-151497

(51) Int. Cl.
G02F 1/3363 (2006.01)
(52) U.S. Cl. .................. 428/1.3; 428/1.1; 349/118; 349/120; 359/494; 359/499
(58) Field of Classification Search ............... 428/1.1, 428/1.3; 349/117–122, 143, 158; 359/494, 359/499
See application file for complete search history.

(56) References Cited

U.S. PATENT DOCUMENTS

| | | | | |
|---|---|---|---|---|
| 5,344,916 A | * | 9/1994 | Harris et al. | 528/353 |
| 5,528,400 A | * | 6/1996 | Arakawa | 349/117 |
| 5,550,661 A | * | 8/1996 | Clark et al. | 349/117 |
| 5,625,474 A | * | 4/1997 | Aomori et al. | 349/79 |
| 5,658,505 A | | 8/1997 | Shimizu et al. | |
| 5,750,641 A | * | 5/1998 | Ezzell et al. | 528/353 |
| 5,805,253 A | * | 9/1998 | Mori et al. | 349/118 |
| 5,999,243 A | * | 12/1999 | Kameyama et al. | 349/185 |

(Continued)

FOREIGN PATENT DOCUMENTS

EP 0 487 359 5/1992

(Continued)

OTHER PUBLICATIONS

Suguru Yamamoto, Retardation Film for LCD, Nitto Technical Report, vol. 28, No. 2, pp. 105-113, Oct. 1990.

*Primary Examiner*—Harold Pyon
*Assistant Examiner*—Sow-Fun Hon
(74) *Attorney, Agent, or Firm*—Westerman, Hattori Daniels & Adrian LLP (57) ABSTRACT

An optical film including a transparent polymer film (b) and a birefringent layer (a) formed of a polymer and laminated above the transparent polymer film (b) is provided. The birefringent layer (a) and the transparent polymer film (b) satisfy the following formula (1), the birefringent layer (a) satisfies the following formulae (2) and (3), and the polymer forming the birefringent layer (a) has a weight-average molecular weight in the range between 10,000 and 400,000 inclusive.

$$\Delta n(a) > \Delta n(b) \times 10 \qquad (1)$$

$$1 < (nx-nz)/(nx-ny) \qquad (2)$$

$$0.0005 \leq \Delta n(a) \leq 0.5 \qquad (3)$$

This optical film can prevent the occurrence of iridescence, the occurrence of cracks, and the occurrence of variation in retardation.

19 Claims, 1 Drawing Sheet

U.S. PATENT DOCUMENTS

| | | | |
|---|---|---|---|
| 6,166,799 A * | 12/2000 | Kameyama et al. | 349/185 |
| 6,359,669 B1 * | 3/2002 | Dehmlow | 349/62 |
| 6,795,246 B1 * | 9/2004 | Yano et al. | 359/500 |
| 6,881,456 B1 * | 4/2005 | Yano et al. | 428/1.3 |

FOREIGN PATENT DOCUMENTS

| | | |
|---|---|---|
| EP | 1 160 591 | 12/2001 |
| JP | 3-24502 | 2/1991 |
| JP | 3-33719 | 2/1991 |
| JP | 6-130228 | 5/1994 |
| JP | 08-62422 A | 3/1996 |
| JP | 8-511812 | 12/1996 |
| JP | 10-153708 | 6/1998 |
| JP | 10-508048 | 8/1998 |
| JP | 2000-190385 A | 7/2000 |
| JP | 2000-511296 | 8/2000 |
| JP | 2001-290023 A | 10/2001 |
| JP | 2001-318223 A | 11/2001 |
| JP | 2001-337201 | 12/2001 |
| JP | 2001-343529 | 12/2001 |
| JP | 4-194820 | 7/2004 |
| WO | WO 94/24191 | 10/1994 |
| WO | WO 96/11967 | 4/1996 |
| WO | WO 97/44704 | 11/1997 |

\* cited by examiner

OPTICAL FILM

TECHNICAL FIELD

The present invention relates to an optical film suitable for optical compensation of a liquid crystal cell.

BACKGROUND ART

Conventionally, a retardation plate has been used in various liquid crystal displays in order to achieve optical compensation. As such a retardation plate, an optically uniaxial film or an optically biaxial film has been used, for example. The optically uniaxial film can be produced, for example, by forming a particular polyimide into a film. The optical uniaxiality of the film is derived from the nature of the polyimide itself, and the obtained film exhibits negative uniaxial optical characteristics (see H8(1996)-511812 A, for example). On the other hand, the optically biaxial film has an excellent optical compensation function. For example, when the optically biaxial film is arranged as an optical film between a liquid crystal cell and a polarizer of a liquid crystal display, it can enhance the display characteristics of the liquid crystal display, for example, by widening its viewing angle. On this account, in recent years, instead of the optically uniaxial film, the optically biaxial film is used as a retardation plate more and more widely. The optically biaxial film can be produced, for example, by various polymer film stretching methods (see H3(1991)-33719 A, for example) and biaxially stretching methods (see H3(1991)-24502 A, for example). Also, there has been known a retardation plate in which a uniaxially stretched polymer film having a positive optical anisotropy and a biaxially stretched polymer film having a negative optical anisotropy and whose in-plane retardation is small are used in combination (see H4(1992)-194820 A, for example).

Disclosure of Invention

Although such an optically biaxial film produces an effect that it provides a liquid crystal display achieving excellent contrast over a wide viewing angle when used in the liquid crystal display, there has been a problem in that it causes iridescence. Also, some optically biaxial films formed of particular polymers have a problem in that cracks and/or variation in retardation may occur in the films.

Therefore, it is an object of the present invention to provide an optical film having an optical biaxiality, capable of preventing the occurrence of iridescence, the occurrence of cracks, variation in retardation, a poor appearance, and the like when used in various displays such as a liquid crystal display, and further enhancing the display characteristics of the displays.

The present invention provides an optical film including: a transparent polymer film (b); and a birefringent layer (a) formed of a polymer and laminated above the transparent polymer film (b). The birefringent layer (a) and the transparent polymer film (b) satisfy a formula (1) below, the birefringent layer (a) satisfies formulae (2) and (3) below, and the polymer forming the birefringent layer (a) has a weight-average molecular weight in a range between 10,000 and 400,000 inclusive.

$$\Delta n(a) > \Delta n(b) \times 10 \quad (1)$$

$$1 < (nx - nz)/(nx - ny) \quad (2)$$

$$0.000523 \leq \Delta n(a) \leq 0.5 \quad (3)$$

In the above formulae, $\Delta n(a)$ is a birefringence of the birefringent layer (a) and is represented by $[(nx+ny)/2]-nz$; $\Delta n(b)$ is a birefringence of the transparent polymer film (b) and is represented by $[(nx'+ny')/2]-nz'$; $nx$, $ny$, and $nz$ represent refractive indices in an X-axis direction, a Y-axis direction, and a Z-axis direction in the birefringent layer (a), respectively, with the X-axis direction being an axial direction exhibiting a maximum refractive index within a plane of the birefringent layer (a), the Y-axis direction being an axial direction perpendicular to the X-axis within the plane, and the Z-axis direction being a thickness direction perpendicular to the X-axis and the Y-axis; and $nx'$, $ny'$, and $nz'$ represent refractive indices in an X-axis direction, a Y-axis direction, and a Z-axis direction in the transparent polymer film (b), respectively, with the X-axis direction being an axial direction exhibiting a maximum refractive index within a plane of the transparent polymer film (b), the Y-axis direction being an axial direction perpendicular to the X-axis within the plane, the Z-axis direction being a thickness direction perpendicular to the X-axis and the Y-axis.

PREFERRED MODE FOR CARRYING OUT THE INVENTION

The inventors of the present invention found out that, when an optical film of the present invention including a transparent polymer film (b) and a birefringent layer (a) formed of a polymer and laminated above the transparent polymer film (b) satisfies all the conditions represented by formulae (1) to (3), the occurrence of iridescence can be suppressed. The inventors of the present invention also found out that, when the polymer forming the birefringent layer (a) has a weight-average molecular weight in a particular range, the occurrence of cracks, variation in retardation, and a poor appearance can be suppressed. Based on these findings, the inventors arrived at the present invention.

In the present invention, it is necessary that $\Delta n(a)$ as a birefringence of the birefringent layer (a) and $\Delta n(b)$ as a birefringence of the transparent polymer film (b) satisfy the above formula (1).

Usually, the optical compensation is performed by the birefringent layer (a). Thus, in order to prevent the birefringence of the transparent polymer film (b) from hindering the compensation in the optical design, the above relationship needs to be satisfied.

Preferably, $\Delta n(a)$ and $\Delta n(b)$ satisfy the relationship of $\Delta n(a) > \Delta n(b) \times 15$, because this allows an optical film that is still further visually compensated to be obtained. More preferably, $\Delta n(a)$ and $\Delta n(b)$ satisfy the relationship of $\Delta n(a) > \Delta n(b) \times 20$.

Figure 1:
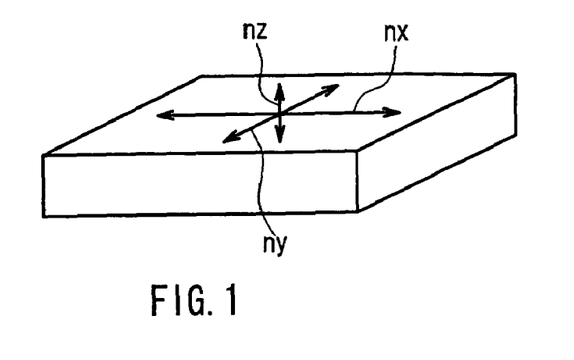
FIG. 1 shows an example of axial directions of a birefringent layer (a) in an optical film according to the present invention.

The axial directions of the refractive indices ($nx$, $ny$, $nz$) in the birefringent layer (a) are indicated specifically by arrows in a schematic view of FIG. 1. As mentioned above, the refractive indices nx, ny, and nz indicate refractive indices in an X-axis direction, a Y-axis direction, and a Z-axis direction, respectively. The X-axis direction is an axial direction exhibiting a maximum refractive index within the plane, the Y-axis direction is an axial direction perpendicular to the X axis within the plane, and the Z-axis direction is a thickness direction perpendicular to the X axis and the Y axis.

Furthermore, in the present invention, it is necessary that the birefringent layer (a) satisfies the above formula (2). When the optical film of the present invention satisfies 1<(nx−nz)/(nx−ny), the birefringence in its thickness direction becomes greater than those within a film plane. Thus, the optical film satisfying the above relationship is excellent in optical compensation of a liquid crystal cell, for example.

Furthermore, the value of (nx−nz)/(nx−ny) preferably satisfies (nx−nz)/(nx−ny)<100, because this allows, when the optical film of the present invention is used, for example, in a liquid crystal display, a sufficient contrast ratio and more excellent viewing angle characteristics to be obtained. Still further, the value of (nx−nz)/(nx−ny) preferably satisfies 1<(nx−nz)/(nx−ny)≦80, more prefeaby 1 (nx−nz) (nx−ny) ≦50, to provide an optical film excellent in optical compensation. Furthermore, when the optical film is used in a vertically aligned (VA) mode liquid crystal displays, it is preferable that the value of (nx−nz)/(nx−ny) satisfies 1≦(nx−nz)/(nx−ny)≦30.

In the present invention, it is necessary that the value of the birefringence (Δn(a)) of the birefringent layer (a) satisfies the above formula (3), i.e., the value of the birefringence (Δn(a)) needs to be in the range from 0.0005 to 0.5. When the value of the birefringence (Δn(a)) is 0.0005 or more, it is possible to obtain a thinner birefringent layer. On the other hand, when the value of the birefringence (Δn(a)) is 0.5 or less, it is possible to control the retardation easily. In order to obtain an optical film with excellent productivity, the value of the birefringence (Δn(a)) preferably ranges from 0.01 to 0.2, more preferably from 0.02 to 0.15.

In the present invention, the thickness of the birefringent layer (a) is not particularly limited, but ranges, for example, from 0.1 to 50 μm, preferably from 0.5 to 30 μm, and more preferably from 1 to 20 μm, in order to provide a uniform optical film with an excellent visually-compensating function while reducing the thickness of a liquid crystal display as much as possible.

The thickness of the transparent polymer film (b) can be determined suitably depending on the intended use and the like, but ranges, for example, from 5 to 500 μm, preferably from 10 to 200 μm, and more preferably from 15 to 150 μm, considering the strength of the optical film, the reduction in the thickness of the optical film, and the like.

The birefringent layer (a) may be laminated on one or both surfaces of the transparent polymer film (b). The number of the birefringent layers may be one or at least two for each surface. Moreover, the birefringent layer (a) may be laminated directly on the transparent polymer film (b), or alternatively, an additional layer(s) may be arranged between the birefringent layer (a) and the transparent polymer film (b).

The transparent polymer film (b) can be either a monolayer or a laminate including two or more layers. When the transparent polymer film is a laminate, layers included therein may be either the same or different polymer layers, depending on the intended use of the transparent polymer film (b), such as improving a strength, a heat resistance, or adhesion to the birefringent layer (a), for example.

The material for the birefringent layer (a) is not particularly limited as long as the birefringent layer (a) obtained finally satisfies the above-described respective conditions of the present invention. However, in order to obtain the birefringent layer (a) that satisfies the condition (1) among these conditions, it is preferable to select the material for the birefringent layer (a), for example, depending on the material for the transparent polymer film (b) to be described later. Preferable example of the method of selecting the materials for the birefringent layer (a) and the transparent polymer film (b) is as follows: the material for the birefringent layer (a) is selected so that the birefringence of the birefringent layer (a) formed using the selected material becomes relatively high, whereas the material for the transparent polymer film (b) is selected so that the birefringence of the transparent polymer film (b) formed using the selected material becomes relatively low.

The polymer used for forming the birefringent layer (a) in the present invention has a weight-average molecular weight (Mw) in the range between 10,000 and 400,000 inclusive, where the weight-average molecular weight (Mw) is measured by gel permeation chromatography (GPC) using as a standard sample polyethylene oxide dissolved in a dimethylformamide solvent. By using a polymer having a weight-average molecular weight (Mw) of 10,000 or more, a birefringent layer exhibiting a high birefringence can be obtained, and in addition, the occurrence of cracks can be prevented. Furthermore, by using a polymer having a weight-average molecular weight (Mw) of 400,000 or less, variation in retardation can be prevented. The reason for this is that, in the case where the birefringent layer (a) is formed by applying a polymer solution, the viscosity of a solution of a polymer having a weight-average molecular weight (Mw) of 400,000 or less is not too high, thereby allowing a base or the like to be coated with the polymer solution easily so that a uniform birefringent layer (a) can be formed. When preparing a polymer solution using a polymer having a weight-average molecular weight (Mw) of 400,000 or less, the amount of the solvent used may be small because the solubility of the polymer is high. As a result, the coating layer can be made thin so that coating can be performed with high precision. The weight-average molecular weight (Mw) of a polymer forming the birefringent layer (a) preferably ranges between 10,000 and 300,000 inclusive, more preferably between 10,000 and 200,000 inclusive.

The material for the birefringent layer (a) preferably is a non-liquid crystalline polymer. Unlike a liquid crystal polymer, a non-liquid crystalline polymer forms a film exhibiting an optical uniaxiality satisfying nx>nz and also ny>nz according to its own nature, regardless of the aligning property of a base. Thus, the base used is not limited to an alignment base. For example, even when an unaligned base is used, the process for coating a surface of the base with an alignment film, laminating an alignment film on a surface of the base, or the like may be omitted.

In the present invention, as a non-liquid crystalline polymer, at least one polymer selected from the group consisting of polyamide, polyimide, polyester, polyetherketone, polyaryletherketone, polyamide imide, and polyesterimide preferably is used. These polymers are suitable as a material for a biaxial film because of their excellent heat resistance, chemical resistance, hardness, and transparency. There is no particular limitation on the non-liquid crystalline polymer to be used, and any conventionally known polymer materials can be used suitably as long as the characteristics of the optical film of the present invention are satisfied. These polymers may be use either alone or in arbitrary combination.

As the polyimide, it is preferable to use a polyimide that has a high in-plane aligning property and is soluble in an organic solvent. Specifically, examples of such a polyimide include a condensation polymer product of 9,9-bis(aminoaryl)fluorene and an aromatic tetracarboxylic dianhydride disclosed in JP 2000-511296 A, i.e., a polymer containing at least one repeating unit represented by the formula (1) below.

(1)

In the above formula (1), $R^3$ to $R^6$ are at least one substituent selected independently from the group consisting of hydrogen, halogen, a phenyl group, a phenyl group substituted with 1 to 4 halogen atoms or a $C_{1-10}$ alkyl group, and a $C_{1-10}$ alkyl group. Preferably, $R^3$ to $R^6$ are at least one substituent selected independently from the group consisting of halogen, a phenyl group, a phenyl group substituted with 1 to 4 halogen atoms or a $C_{1-10}$ alkyl group, and a $C_{1-10}$ alkyl group.

In the above formula (1), Z is, for example, a $C_{6-20}$ quadrivalent aromatic group, and preferably is a pyromellitic group, a polycyclic aromatic group, a derivative of a polycyclic aromatic group, or a group represented by the formula (2) below.

(2)

In the formula (2) above, Z' is, for example, a covalent bond, a $C(R^7)_2$ group, a CO group, an O atom, an S atom, an $SO_2$ group, an $Si(C_2H_5)_2$ group, or an $NR^8$ group. When there are plural Z's, they may be the same or different. Also, w is an integer from 1 to 10. $R^7$s independently are hydrogen or $C(R^9)_3$. $R^8$ is hydrogen, an alkyl group having from 1 to about 20 carbon atoms, or a $C_{6-20}$ aryl group, and when there are plural $R^8$s, they may be the same or different. $R^9$s independently are hydrogen, fluorine, or chlorine.

The above-mentioned polycyclic aromatic group may be, for example, a quadrivalent group derived from naphthalene, fluorene, benzofluorene, or anthracene. Further, a substituted derivative of the above-mentioned polycyclic aromatic group may be the above-mentioned polycyclic aromatic group substituted with at least one group selected from the group consisting of, for example, a $C_{1-10}$ alkyl group, a fluorinated derivative thereof, and halogen such as F and Cl.

Other than the above, homopolymer whose repeating unit is represented by the general formula (3) or (4) below or polyimide whose repeating unit is represented by the general formula (5) below disclosed in JP 8(1996)-511812 A may be used, for example. The polyimide represented by the formula (5) below is a preferable mode of the homopolymer represented by the formula (3).

(3)

(4)

(5)

In the above general formulae (3) to (5), G and G' each are a group selected independently from the group consisting of, for example, a covalent bond, a $CH_2$ group, a $C(CH_3)_2$ group, a $C(CF_3)_2$ group, a $C(CX_3)_2$ group (wherein X is halogen), a CO group, an O atom, an S atom, an $SO_2$ group, an $Si(CH_2CH_3)_2$ group, and an $N(CH_3)$ group, and G and G' may be the same or different.

In the above formulae (3) and (5), L is a substituent, and d and e indicate the number of substitutions therein. L is, for example, halogen, a $C_{1-3}$ alkyl group, a halogenated $C_{1-3}$ alkyl group, a phenyl group, or a substituted phenyl group, and when there are plural Ls, they may be the same or different. The above-mentioned substituted phenyl group may be, for example, a substituted phenyl group having at least one substituent selected from the group consisting of halogen, a $C_{1-3}$ alkyl group and a halogenated $C_{1-3}$ alkyl group. Also, the above-mentioned halogen may be, for example, fluorine, chlorine, bromine, or iodine. d is an integer from 0 to 2, and e is an integer from 0 to 3.

In the above formulae (3) to (5), Q is a substituent, and f indicates the number of substitutions therein. Q may be, for example, an atom or a group selected from the group consisting of hydrogen, halogen, an alkyl group, a substituted alkyl group, a nitro group, a cyano group, a thioalkyl group, an alkoxy group, an aryl group, a substituted aryl group, an alkyl ester group and a substituted alkyl ester group and, when there are plural Qs, they may be the same or different. The above-mentioned halogen may be, for example, fluorine, chlorine, bromine, or iodine. The above-mentioned substituted alkyl group may be, for example, a halogenated alkyl group. Also, the above-mentioned substituted aryl group may be, for example, a halogenated aryl group. f is an integer from 0 to 4, and g and h respectively are an integer from 0 to 3 and an integer from 1 to 3. Furthermore, it is preferable that g and h are larger than 1.

In the above formula (4), $R^{10}$ and $R^{11}$ are groups selected independently from the group consisting of hydrogen, halogen, a phenyl group, a substituted phenyl group, an alkyl group, and a substituted alkyl group. It is particularly preferable that $R^{10}$ and $R^{11}$ independently are a halogenated alkyl group.

In the above formula (5), $M^1$ and $M^2$ may be the same or different and, for example, halogen, a $C_{1-3}$ alkyl group, a halogenated $C_{1-3}$ alkyl group, a phenyl group, or a substituted phenyl group. The above-mentioned halogen may be, for example, fluorine, chlorine, bromine, or iodine. The above-mentioned substituted phenyl group may be, for example, a substituted phenyl group having at least one substituent selected from the group consisting of halogen, a $C_{1-3}$ alkyl group, and a halogenated $C_{1-3}$ alkyl group.

A specific example of polyimide represented by the formula (3) includes polyimide represented by the formula (6) below.

(6)

Moreover, the above-mentioned polyimide may be, for example, copolymer obtained by copolymerizing acid dianhydride and diamine other than the above-noted skeleton (the repeating unit) suitably.

The above-mentioned acid dianhydride may be, for example, aromatic tetracarboxylic dianhydride. The aromatic tetracarboxylic dianhydride may be, for example, pyromellitic dianhydride, benzophenone tetracarboxylic dianhydride, naphthalene tetracarboxylic dianhydride, heterocyclic aromatic tetracarboxylic dianhydride, or 2,2'-substituted biphenyl tetracarboxylic dianhydride.

The pyromellitic dianhydride may be, for example, pyromellitic dianhydride, 3,6-diphenyl pyromellitic dianhydride, 3,6-bis(trifluoromethyl)pyromellitic dianhydride, 3,6-dibromopyromellitic dianhydride, or 3,6-dichloropyromellitic dianhydride. The benzophenone tetracarboxylic dianhydride may be, for example, 3,3',4,4'-benzophenone tetracarboxylic dianhydride, 2,3,3',4'-benzophenone tetracarboxylic dianhydride, or 2,2',3,3'-benzophenone tetracarboxylic dianhydride. The naphthalene tetracarboxylic dianhydride may be, for example, 2,3,6,7-naphthalenetetracarboxylic dianhydride, 1,2,5,6-naphthalenetetracarboxylic dianhydride, or 2,6-dichloro-naphthalene-1,4,5,8-tetracarboxylic dianhydride. The heterocyclic aromatic tetracarboxylic dianhydride may be, for example, thiophene-2,3,4,5-tetracarboxylic dianhydride, pyrazine-2,3,5,6-tetracarboxylic dianhydride, or pyridine-2,3,5,6-tetracarboxylic dianhydride. The 2,2'-substituted biphenyl tetracarboxylic dianhydride may be, for example, 2,2'-dibromo-4,4',5,5'-biphenyl tetracarboxylic dianhydride, 2,2'-dichloro-4,4',5,5'-biphenyl tetracarboxylic dianhydride, or 2,2'-bis(trifluoromethyl)-4,4',5,5'-biphenyl tetracarboxylic dianhydride.

Other examples of the aromatic tetracarboxylic dianhydride may include 3,3',4,4'-biphenyl tetracarboxylic dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)-1,1,1,3,3,3-hexafluoropropane dianhydride, 4,4'-bis(3,4-dicarboxyphenyl)-2,2-diphenylpropane dianhydride, bis(3,4-dicarboxyphenyl)ether dianhydride, 4,4'-oxydiphthalic dianhydride, bis(3,4-dicarboxyphenyl)sulfonic dianhydride, 3,3',4,4'-diphenylsulfone tetracarboxylic dianhydride, 4,4'-[4,4'-isopropylidene-di(p-phenyleneoxy)]bis(phthalic dianhydride), N,N-(3,4-dicarboxyphenyl)-N-methylamine dianhydride, and bis(3,4-dicarboxyphenyl)diethylsilane dianhydride.

Among the above, the aromatic tetracarboxylic dianhydride preferably is 2,2'-substituted biphenyl tetracarboxylic dianhydride, more preferably is 2,2'-bis(trihalomethyl)-4,4',5,5'-biphenyl tetracarboxylic dianhydride, and further preferably is 2,2'-bis(trifluoromethyl)-4,4',5,5'-biphenyl tetracarboxylic dianhydride.

The above-mentioned diamine may be, for example, aromatic diamine. Specific examples thereof include benzenediamine, diaminobenzophenone, naphthalenediamine, heterocyclic aromatic diamine, and other aromatic diamines.

The benzenediamine may be, for example, diamine selected from the group consisting of benzenediamines such as o-, m-, and p-phenylenediamine, 2,4-diaminotoluene, 1,4-diamino-2-methoxybenzene, 1,4-diamino-2-phenylbenzene, and 1,3-diamino-4-chlorobenzene. Examples of the diaminobenzophenone may include 2,2'-diaminobenzophenone and 3,3'-diaminobenzophenone. The naphthalenediamine may be, for example, 1,8-diaminonaphthalene or 1,5-diaminonaphthalene. Examples of the heterocyclic aromatic diamine may include 2,6-diaminopyridine, 2,4-diaminopyridine, and 2,4-diamino-S-triazine.

Further, other than the above, the aromatic diamine may be 4,4'-diaminobiphenyl, 4,4'-diaminodiphenyl methane, 4,4'-(9-fluorenylidene)-dianiline, 2,2'-bis(trifluoromethyl)-4,4'-diaminobiphenyl, 3,3'-dichloro-4,4'-diaminodiphenyl methane, 2,2'-dichloro-4,4'-diaminobiphenyl, 2,2',5,5'-tetrachlorobenzidine, 2,2-bis(4-aminophenoxyphenyl)propane, 2,2-bis(4-aminophenyl)propane, 2,2-bis(4-aminophenyl)-1,1,1,3,3,3-hexafluoropropane, 4,4'-diamino diphenyl ether, 3,4'-diamino diphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis [4-(4-aminophenoxy)phenyl]propane, 2,2-bis [4-(4-aminophenoxy)phenyl]-1,1,1,3,3,3,-hexafluoropropane, 4,4'-diamino diphenyl thioether, or 4,4'-diaminodiphenylsulfone.

The polyetherketone may be, for example, polyaryletherketone represented by the general formula (7) below, which is disclosed in JP 2001-49110 A.

(7)

In the above formula (7), X is a substituent, and q is the number of substitutions therein. Also, a indicates the number of substitutions in a fluorine atom. X is, for example, a halogen atom, a lower alkyl group, a halogenated alkyl group, a lower alkoxy group, or a halogenated alkoxy group, and when there are plural Xs, they may be the same or different.

The halogen atom may be, for example, a fluorine atom, a bromine atom, a chlorine atom, or an iodine atom, and among these, a fluorine atom is preferable. The lower alkyl group preferably is a $C_{1-6}$ lower straight chain alkyl group or a $C_{1-6}$ lower branched chain alkyl group and more preferably is a $C_{1-4}$ straight or branched chain alkyl group, for example. More specifically, it preferably is a methyl group, an ethyl group, a propyl group, an isopropyl group, a butyl group, an isobutyl group, a sec-butyl group, or a tert-butyl group, and particularly preferably is a methyl group or an ethyl group. The halogenated alkyl group may be, for example, a halide of the above-mentioned lower alkyl group such as a trifluoromethyl group. The lower alkoxy group preferably is a $C_{1-6}$ straight or branched chain alkoxy group and more preferably is a $C_{1-4}$ straight or branched chain alkoxy group, for example. More specifically, it further preferably is a methoxy group, an ethoxy group, a propoxy group, an isopropoxy group, a butoxy group, an isobutoxy group, a sec-butoxy group, or a tert-butoxy group, and particularly preferably is a methoxy group or an ethoxy group. The halogenated alkoxy group may be, for example, a halide of the above-mentioned lower alkoxy group such as a trifluoromethoxy group.

In the above formula (7), q and a is an integer from 0 to 4. In the formula (7), it is preferable that q=0 and a carbonyl group and an oxygen atom of an ether that are bonded to both ends of a benzene ring are present at para positions.

Also, in the above formula (7), $R^1$ is a group represented by the formula (8) below, and m is an integer of 0 or 1.

(8)

In the above formula (8), X' is a substituent and is the same as X in the formula (7), for example. In the formula (8), when there are plural X's, they may be the same or different. q' indicates the number of substitutions in the X' and is an integer from 0 to 4, preferably, q'=0. In addition, p is an integer of 0 or 1. b indicates the number of substitutions in a fluorine atom and is an integer from 0 to 4.

In the formula (8), $R^2$ is a divalent aromatic group. This divalent aromatic group is, for example, an o-, m-, or p-phenylene group or a divalent group derived from naphthalene, biphenyl, anthracene, o-, m-, or p-terphenyl, phenanthrene, dibenzofuran, biphenyl ether, or biphenyl sulfone. In these divalent aromatic groups, hydrogen that is bonded directly to the aromatic may be substituted with a halogen atom, a lower alkyl group, or a lower alkoxy group. Among them, the $R^2$ preferably is an aromatic group selected from the group consisting of the formulae (9) to (15) below.

(9)

(10)

(11)

(12)

(13)

(14)

-continued (15)

In the above formula (7), the $R^1$ preferably is a group represented by the formula (16) below, wherein $R^2$ and p are equivalent to those in the above-noted formula (8).

(16)

Furthermore, in the formula (7), n indicates a degree of polymerization ranging, for example, from 2 to 5000 and preferably from 5 to 500. The polymerization may be composed of repeating units with the same structure or those with different structures. In the latter case, the polymerization form of the repeating units may be a block polymerization or a random polymerization.

Moreover, it is preferable that an end on a p-tetrafluorobenzoylene group side of the polyaryletherketone represented by the formula (7) is fluorine and an end on an oxyalkylene group side thereof is a hydrogen atom. Such a polyaryletherketone can be represented by the general formula (17) below, for example. In the formula below, n indicates a degree of polymerization as in the formula (7).

(17)

Specific examples of the polyaryletherketone represented by the formula (7) may include those represented by the formulae (18) to (21) below, wherein n indicates a degree of polymerization as in the formula (7).

(18)

(19)

(20)

(21)

Other than the above, the polyamide or polyester may be, for example, polyamide or polyester described by JP 10(1998)-508048 A, and their repeating units can be represented by the general formula (22) below.

(22)

In the above formula (22), Y is O or NH. E is, for example, at least one group selected from the group consisting of a covalent bond, a $C_2$ alkylene group, a halogenated $C_2$ alkylene group, a $CH_2$ group, a $C(CX_3)_2$ group (wherein X is halogen or hydrogen), a CO group, an O atom, an S atom, an $SO_2$ group, an $Si(R)_2$ group, and an $N(R)$ group, and Es may be the same or different. In the above-mentioned E, R is at least one of a $C_{1-3}$ alkyl group and a halogenated $C_{1-3}$ alkyl group and present at a meta position or a para position with respect to a carbonyl functional group or a Y group.

Further, in the above formula (22), A and A' are substituents, and t and z respectively indicate the numbers of substitutions therein. Additionally, p is an integer from 0 to 3, q is an integer from 1 to 3, and r is an integer from 0 to 3.

The above-mentioned A is selected from the group consisting of, for example, hydrogen, halogen, a $C_{1-3}$ alkyl group, a halogenated $C_{1-3}$ alkyl group, an alkoxy group represented by OR (wherein R is the group defined above), an aryl group, a substituted aryl group by halogenation or the like, a $C_{1-9}$ alkoxycarbonyl group, a $C_{1-9}$ alkylcarbonyloxy group, a $C_{1-12}$ aryloxycarbonyl group, a $C_{1-12}$ arylcarbonyloxy group and a substituted derivative thereof, a $C_{1-12}$ arylcarbamoyl group, and a $C_{1-12}$ arylcarbonylamino group and a substituted derivative thereof. When there are plural As, they may be the same or different. The above-mentioned A' is selected from the group consisting of, for example, halogen, a $C_{1-3}$ alkyl group, a halogenated $C_{1-3}$ alkyl group, a phenyl group, and a substituted phenyl group and when there are plural A's, they may be the same or different. A substituent on a phenyl ring of the substituted phenyl group can be, for example, halogen, a $C_{1-3}$ alkyl group, a halogenated $C_{1-3}$ alkyl group, or a combination thereof. The t is an integer from 0 to 4, and the z is an integer from 0 to 3.

Among the repeating units of the polyamide or polyester represented by the formula (22) above, the repeating unit represented by the general formula (23) below is preferable.

(23)

In the formula (23), A, A', and Y are those defined by the formula (22), and v is an integer from 0 to 3, preferably is an integer from 0 to 2. Although each of x and y is 0 or 1, not both of them are 0.

The transparent polymer film (b) of the present invention is not particularly limited, and any conventionally known transparent films can be used. For example, it is preferable that the transparent polymer film (b) is a protective film for a polarizer as will be described later, because this allows the optical film of the present invention to serve also as a protective film for a polarizing plate.

The material for the transparent polymer film (b) is not particularly limited as long as the transparent polymer film (b) obtained finally satisfies the above-described condition (1) of the present invention. However, as the material for the transparent polymer film (b), polymers having an excellent transparency are preferable, and also thermoplastic resins are preferable because they are suitable for a treatment for stretching or shrinking the film as described later. Specific examples of the thermoplastic resins include acetate resins such as triacetylcellulose (TAC), polyester resins, polyethersulfone resins, polysulfone resins, polycarbonate resins, polyamide resins, polyimide resins, polyolefin resins, acrylic resins, polynorbornene resins, cellulose resins, polyarylate resins, polystyrene resins, polyvinyl alcohol resins, polyvinyl chloride resins, polyvinylidene chloride resins, polyacrylic resins, and mixtures thereof. Liquid crystal polymers and the like also can be used.

Furthermore, as a material for the transparent polymer film (b), a mixture of a thermoplastic resin whose side chain has a substituted or unsubstituted imido group and a thermoplastic resin whose side chain has a substituted or unsubtituted phenyl group and nitrile group, disclosed in JP 2001-343529 A (WO 01/37007), or the like also may be used. Specific examples of such a mixture include a resin composition containing an alternating copolymer of isobutene and N-methylene maleimide and an acrylonitrile-styrene copolymer. Among these materials, materials that can form transparent films whose birefringence is relatively low are preferable, and more specifically, a mixture of a thermoplastic resin whose side chain has a substituted or unsubtituted imido group and a thermoplastic resin whose side chain has a substituted or unsubstituted phenyl group and nitrile group is preferable.

The transparent polymer film (b) may be subjected a treatment for imparting an optical anisotropy to the film. For example, the transparent polymer film (b) may be stretched previously. As the method of stretching the transparent polymer film (b), tenter transverse stretching and biaxial stretching in which the stretch ratio in the long axis direction is lower than that in the short axis direction are preferable. The biaxial stretching can be selected from simultaneous biaxial stretching that uses a tenter alone, and sequential biaxial stretching that uses rollers and a tenter. Though the stretch ratio varies depending on the stretching method, the polymer film may be stretched 1 to 200%, for example. The heating temperature when stretching the polymer film is selected suitably depending on the glass transition point (Tg) of the polymer film in use, the kinds of additives in the polymer film, and the like, but may be, for example, in the range from 80° C. to 250° C., preferably from 120° C. to 220° C., and particularly preferably from 140° C. to 200° C. Especially, it is preferable that the temperature for stretching the polymer film is substantially equal to or higher than Tg of the polymer film.

Other than the above, a mixture containing a thermoplastic resin whose side chain has a substituted or unsubtituted imido group and a thermoplastic resin whose side chain has a substituted or unsubstituted phenyl group and nitrile group, liquid crystal polymers, and the like also may be used.

Moreover, it is preferable that the transparent polymer film (b) is a polarizer including a polyvinyl alcohol-based film as will be described later, because this allows the optical film of the present invention to serve also as a polarizing plate.

An optical film according to the present invention can be produced in the following manner, for example. First, the predetermined polymer for forming a birefringent layer (a) is applied onto a transparent polymer film (b) to form a precursor layer of the birefringent layer (a). The transparent polymer film may have been subjected to a stretching treatment as described above. The method of applying the polymer is not particularly limited, but may be a method of applying the polymer that has been heated and melted, a method of applying a polymer solution prepared by dissolving the polymer in a solvent, or the like, for example. Among these, the method of applying a polymer solution is preferable because of its excellent workability and its optical anisotropy controllability.

The thickness of the birefringent layer (a) formed can be adjusted through the process for applying the polymer. For example, in the method of applying a polymer solution, the thickness of the birefringent layer (a) can be adjusted by adjusting the amount of the polymer applied per area (cm$^2$) of the transparent polymer film (b).

The solvent of the polymer solution is not particularly limited as long as it can dissolve the polymer, and can be, for example, halogenated hydrocarbons such as chloroform, dichloromethane, carbon tetrachloride, dichloroethane, tetrachloroethane, trichloroethylene, tetrachloroethylene, chlorobenzene, and orthodichlorobenzene; phenols such as phenol and parachlorophenol; aromatic hydrocarbons such as benzene, toluene, xylene, methoxybenzene, and 1,2-dimethoxybenzene; ketones such as acetone, methyl ethyl ketone, methyl isobutyl ketone, cyclohexanone, cyclopentanone, 2-pyrrolidone, and N-methyl-2-pyrrolidone; esters such as ethyl acetate and butyl acetate; alcohols such as t-butyl alcohol, glycerin, ethylene glycol, triethylene glycol, ethylene glycol monomethyl ether, diethylene glycol dimethyl ether, propylene glycol, dipropylene glycol, and 2-methyl-2,4-pentanediol; amides such as dimethylformamide and dimethylacetamide; nitriles such as acetonitrile and butyronitrile; ethers such as diethyl ether, dibutyl ether, and tetrahydrofuran; or carbon disulfide, ethyl cellosolve, or butyl cellosolve. It is possible to use one of these solvents alone or a mixture of two or more solvents.

Preferably, the polymer solution has a viscosity allowing the solution to be applied easily. The reason for this is that, if the polymer solution can be applied easily, it is possible to form a uniform birefringent layer (a) as described above. The viscosity ranges, for example, from 0.1 to 12 Pa·s, preferably from 1 to 10 Pa·s, and more preferably from 1 to 5 Pa·s.

Although the concentration of the polymer in the polymer solution is not particularly limited, it preferably is adjusted considering the weight-average molecular weight of the non-liquid crystalline polymer used so that the viscosity of the solution would be in the above-described range. The concentration of the polymer ranges, for example, from 5 to 50 parts by weight, preferably 10 to 40 parts by weight with respect to 100 parts by weight of the solvent.

In the polymer solution, various additives such as a stabilizer, a plasticizer, metal and the like further may be blended as necessary.

Moreover, the polymer solution may contain other resins as long as the aligning property of the polymer does not drop considerably. Such resins can be, for example, resins for general purpose use, engineering plastics, thermoplastic resins, and thermosetting resins.

The resins for general purpose use can be, for example, polyethylene (PE), polypropylene (PP), polystyrene (PS), polymethyl methacrylate (PMMA), an ABS resin, an AS resin, or the like. The engineering plastics can be, for example, polyacetate (POM), polycarbonate (PC), polyamide (PA: nylon), polyethylene terephthalate (PET), polybutylene terephthalate (PBT), or the like. The thermoplastic resins can be, for example, polyphenylene sulfide (PPS), polyethersulfone (PES), polyketone (PK), polyimide (PI), polycyclohexanedimethanol terephthalate (PCT), polyarylate (PAR), liquid crystal polymers (LCP), or the like. The thermosetting resins can be, for example, epoxy resins, phenolic novolac resins, or the like.

When the above-described other resins are blended in the polymer solution as mentioned above, the blend amount ranges, for example, from 0 wt % to 50 wt %, preferably from 0 wt % to 30 wt %, with respect to the polymer.

The coating treatment can be carried out by a suitable method such as spin coating, roller coating, flow coating, printing, dip coating, film flow-expanding, bar coating, or gravure printing. In the coating, polymer layers can be superimposed as required.

Furthermore, the polymer may be applied onto the transparent polymer film (b) while applying a stress in one direction to the transparent polymer film (b), or alternatively, the polymer may be applied while blowing an air or the like on the transparent polymer film (b) from one direction.

Then, the precursor layer is hardened, thus forming an optical film in which a birefringent layer (a) is formed on the transparent polymer film (b). The precursor layer may be hardened by carrying out natural drying (air drying) or heat drying, for example, at 25° C. to 180° C., preferably from 80° C. to 170° C., and more preferably 60° C. to 150° C., after the precursor layer is applied onto the transparent polymer film (b). The time period for drying or heating the precursor layer is determined depending on the temperature at which the drying or heating is performed, whether or not the solvent is used for forming the precursor layer, the kind of the solvent used, and the like, but may be, for instance, for 0.5 to 30 minutes, preferably for 1 to 20 minutes, and more preferably for 1 to 15 minutes.

The method of producing an optical film according to the present invention may further include stretching the laminate of the polymer film and the birefringent layer.

The method of stretching the laminate is not particularly limited, and fixed-end stretching and conventionally known methods can be applied, for example. Among these, tenter transverse stretching and biaxial stretching in which the stretch ratio in the long axis direction is lower than that in the short axis direction are preferable. The biaxial stretching can be selected from simultaneous biaxial stretching that uses a tenter alone, and sequential biaxial stretching that uses rollers and a tenter. Though the stretch ratio varies depending on the stretching method, the laminate may be stretched 1 to 200%, for example. The heating temperature when stretching the laminate is selected suitably depending on the glass transition point (Tg) of the transparent polymer film in use, the kinds of additives in the transparent polymer film, and the like, but may be, for example, in the range from 80° C. to 250° C., preferably from 120° C. to 220° C., and particularly preferably from 140° C. to 200° C. Especially, it is preferable that the temperature for stretching the laminate is substantially equal to or higher than Tg of the polymer film.

Furthermore, the above-described method of producing an optical film according to the present invention can be changed as follows, for example. First, an optical film is produced in the same manner as in the above except that a base, for example, is used instead of the transparent polymer film (b). Then, the base on which a birefringent layer (a) is formed directly is adhered to a transparent polymer film (b) so that the birefringent layer (a) faces the transparent polymer film (b) and thereafter, only the base is peeled off. As described above, an optical film of the present invention can be obtained by transferring the birefringent layer (a) onto the transparent polymer film (b) and then peeling off the base, thus forming a laminate of the birefringent layer (a) and the transparent polymer film (b).

As the base, any suitable materials can be used without any particular limitations. For example, the base may be a polymer film having a low glass transition point (Tg), a polymer film having a high elastic modulus, a base having a linear expansion equal to or greater than that of a material to be applied thereto, a base having a high thermal conductivity, a base having a high aspect ratio, a base having a small thickness, or the like. Furthermore, in order to impart flexibility to the base, any of the following methods can be employed, for example: drying the base without fixing the base, thereby making all the side of the base shrinkable; fixing at least one side of the base, thereby making the sides other than the fixed side(s) of the base shrinkable; utilizing a linear expansion of a metal belt; controlling the shrinkage of a film by fixing the film with a tenter when conveying the film; increasing the shrinkage ratio of the base by expanding the base previously and then drying it; stretching the base before drying it, thereby causing shrinkage of the base due to hardening; and stretching the base during or after the process for drying it. However, it should be noted that the method of imparting flexibility to the base is not limited to these examples.

The thickness of the base can be determined suitably depending on the intended use and the like, but ranges, for example, from 5 to 500 µm, preferably from 10 to 200 µm, and more preferably from 15 to 150 µm, considering the strength of the optical film, the reduction in the thickness of the optical film, and the like.

The optical film according to the present invention may be used alone or, if required, in combination with an additional birefringence film or the like to form a laminate for various optical uses, e.g., optical compensating members of various liquid crystal display elements. For example, the optical film of the present invention may be used in combination with iodine-based or dyestuff-based polarizing plates (or polarizers) that are produced industrially, so as to provide a laminated polarizing plate having a function of compensating and adjusting the birefringence of a liquid crystal display element.

The polarizing plate that may optionally be used in combination with the optical film according to the present invention is not particularly limited. However, the polarizing plate basically is configured by laminating a protective layer (film) on at least one surface of a polarizer.

The polarizer (polarizing film) is not particularly limited, but can be a film prepared by a conventionally known method of, for example, dyeing by allowing a film of various kinds to adsorb a dichroic material such as iodine or a dichroic dye, followed by crosslinking, stretching, and drying. Especially, films that transmit linearly polarized light when natural light is made to enter those films are preferable, and films having excellent light transmittance and polarization degree are preferable. Examples of the film of various kinds in which the dichroic material is to be adsorbed include hydrophilic polymer films such as polyvinyl alcohol (PVA)-based films, partially-formalized PVA-based films, partially-saponified films based on ethylene-vinyl acetate copolymer, and cellulose-based films. Other than the above, polyene aligned films such as dehydrated PVA and dehydrochlorinated polyvinyl chloride can be used, for example. Among them, a PVA-based film prepared by adsorbing iodine or a dichroic dye and aligning the film is used preferably. The thickness of the polarizing film generally is in the range from 1 to 80 µm, though it is not limited to this.

The protective layer (film) is not particularly limited, but can be a conventionally known transparent film. For example, transparent protective films having excellent transparency, mechanical strength, thermal stability, moisture shielding property, and isotropism are preferable. Specific examples of materials for such a transparent protective layer include cellulose-based resins such as triacetylcellulose; transparent resins based on polyester, polycarbonate, polyamide, polyimide, polyethersulfone, polysulfone, polystyrene, polynorbornene, polyolefin, acrylic substances, acetate, and the like; mixtures of a thermoplastic resin whose side chain has a substituted or unsubtituted imido group and a thermoplastic resin whose side chain has a substituted or unsubtituted phenyl group and nitrile group; and liquid crystal polymers. Thermosetting resins or ultraviolet-curing resins based on the acrylic substances, urethane, acrylic urethane, epoxy, silicones, and the like can be used as well. Among them, a TAC film having a surface saponified with alkali or the like is preferable in light of the polarization property and durability.

Moreover, as the protective layer, the polymer film described in JP 2001-343529 A (WO 01/37007) also can be used. The polymer material used can be a resin composition containing a thermoplastic resin whose side chain has a substituted or unsubtituted imido group and a thermoplastic resin whose side chain has a substituted or unsubtituted phenyl group and nitrile group, for example, a resin composition containing an alternating copolymer of isobutene and N-methyl maleimide and an acrylonitrile-styrene copolymer. Alternatively, the polymer film may be formed by extruding the resin composition.

It is preferable that the protective layer is colorless, for example. More specifically, a retardation value (Rth) of the film in its thickness direction as represented by the equation below preferably ranges from −90 nm to +75 nm, more preferably ranges from −80 nm to +60 nm, and particularly preferably ranges from −70 nm to +45 nm. When the retardation value is within the range of −90 nm to +75 nm, coloration (optical coloration) of the polarizing plate, which is caused by the protective film, can be solved sufficiently. In the equation below, nx, ny, and nz are the same as those described above, and d represents a thickness of the protective film.

$$Rz=\{[(nx+ny)/2]-nz\}\cdot d$$

The transparent protective layer further may have an optically compensating function. As such a transparent protective layer having the optically compensating function, it is possible to use, for example, a known layer used for preventing coloration caused by changes in a visible angle based on retardation in a liquid crystal cell or for widening a preferable viewing angle. Specific examples include various stretched films obtained by stretching the above-described transparent resins uniaxially or biaxially, an alignment film of a liquid crystal polymer or the like, and a laminate obtained by providing an alignment layer of a liquid crystal polymer or the like on a transparent base. Among the above, the alignment film of a liquid crystal polymer is preferable because a wide viewing angle with excellent visibility can be achieved. Particularly preferable is an optically compensating retardation plate obtained by supporting an optically compensating layer with the above-mentioned triacetylcellulose film or the like, where the optically compensating layer is made of an incline-alignment layer of a discotic or nematic liquid crystal polymer. This optically compensating retardation plate can be a commercially available product, for example, "WV film" manufactured by Fuji Photo Film Co., Ltd. Alternatively, the optically compensating retardation plate can be prepared by laminating two or more layers of the retardation film and the film support of triacetylcellulose film or the like so as to control the optical characteristics such as retardation.

The thickness of the transparent protective layer is not particularly limited and can be determined suitably according to retardation or a protective strength, for example. The thickness of the transparent protective layer is, for example, not more than 500 µm, preferably in the range from 5 µm to 300 µm, and more preferably in the range from 5 µm to 150 µm.

The transparent protective layer can be formed suitably by a conventionally known method such as a method of coating a polarizing film with the above-mentioned various transparent resins or a method of laminating the transparent resin film, the optically compensating retardation plate, or the like on the polarizing film, or can be a commercially available product.

The transparent protective layer further may be subjected to, for example, a hard coating treatment, an antireflection treatment, treatments for anti-sticking, diffusion and anti-glaring and the like. The hard coating treatment aims to prevent scratches on the surfaces of the polarizing plate, and is a treatment of, for example, providing a hardened coating film that is formed of a curable resin and has excellent hardness and smoothness on a surface of the transparent protective layer. The curable resin can be, for example, ultraviolet-curing resins of silicone base, urethane base, acrylic, and epoxy base. The treatment can be carried out by a conventionally known method. The anti-sticking treatment aims to prevent adjacent layers from sticking to each other. The antireflection treatment aims to prevent reflection of external light on the surface of the polarizing plate, and can be carried out by forming a conventionally known antireflection layer or the like.

The anti-glare treatment aims to prevent reflection of external light on the polarizing plate surface from hindering visibility of light transmitted through the polarizing plate. The anti-glare treatment can be carried out, for example, by providing microscopic asperities on a surface of the transparent protective layer by a conventionally known method. Such microscopic asperities can be provided, for example, by roughening the surface by sand-blasting or embossing, or by blending transparent fine particles in the above-described transparent resin when forming the transparent protective layer.

The above-described transparent fine particles may be silica, alumina, titania, zirconia, stannic oxide, indium oxide, cadmium oxide, antimony oxide, or the like. Other than the above, inorganic fine particles having an electrical conductivity, organic fine particles including, for example, crosslinked or uncrosslinked polymer particles, or the like can be used as well. The average particle diameter of the transparent fine particles ranges, for example, from 0.5 to 20 µm, though there is no particular limitation. A blend ratio of the transparent fine particles ranges, for example, from 2 to 70 parts by weight, preferably from 5 to 50 parts by weight with respect to 100 parts by weight of the above-described transparent resin, though there is no particular limitation.

An anti-glare layer in which the transparent fine particles are blended can be used as the transparent protective layer itself or provided as a coating layer or the like applied onto the transparent protective layer surface. Furthermore, the anti-glare layer also can function as a diffusion layer to diffuse light transmitted through the polarizing plate in order to widen the viewing angle (i.e., visually-compensating function).

The antireflection layer, the anti-sticking layer, the diffusion layer, the anti-glare layer, and the like as mentioned above can be laminated on the polarizing plate, as a sheet of optical layers including these layers, separately from the transparent protective layer.

The method of laminating the respective components (the optical film, the polarizer, the transparent protective film, etc.) is not particularly limited but a conventionally known method can be applied. In general, pressure-sensitive adhesives, adhesives, and the like as described above can be used, and the kinds thereof can be determined suitably depending on the materials or the like of the components. Examples of the adhesives include polymer adhesives based on acrylic substances, vinyl alcohol, silicone, polyester, polyurethane, polyester, or the like and rubber-based adhesives. The above-mentioned pressure-sensitive adhesives and adhesives do not peel off easily even when being exposed to moisture or heat, for example, and have excellent light transmittance and polarization degree. More specifically, PVA adhesives are preferable when the polarizer is formed of a PVA-based film, in light of stability of adhering treatment. These adhesive and pressure-sensitive adhesive may be applied directly to surfaces of the polarizing layer and the transparent protective layer, or a layer of a tape or a sheet formed of the adhesive or pressure-sensitive adhesive may be arranged on the surfaces thereof. Further, when these adhesive and pressure-sensitive adhesive are prepared as an aqueous solution, for example, other additives or a catalyst such as an acid catalyst may be blended as necessary.

In the case of applying the adhesive, other additives or a catalyst such as an acid catalyst further may be blended in the aqueous solution of the adhesive. Though the thickness of the adhesive layer is not particularly limited, for example, it is from 1 nm to 500 nm, preferably from 10 nm to 300 nm, and more preferably from 20 nm to 100 nm. It is possible to adopt a known method of using an adhesive etc. such as an acrylic polymer or a vinyl alcohol-based polymer without any particular limitations.

When forming a laminated polarizing plate by laminating a polarizing plate and an optical film, they may be laminated using any suitable adhesion means such as an adhesive layer or a pressure-sensitive adhesive layer. However, the lamination method is not limited thereto. For example, the lamination method may be as follows. First, using as a transparent polymer film (b) a polymer film formed of triacetylcellulose or the like, which generally is used as a protective layer for a polarizing plate, an optical film is produced by laminating a birefringent layer (a) on this transparent polymer film (b). Then, a protective film formed of triacetylcellulose or the like is adhered to one surface of a polarizer, and the optical film is adhered to the other surface of the polarizer. If the optical film is arranged so that the birefringent layer (a) of the optical film faces the polarizer, the transparent polymer film (b) of the optical film can be used as a protective film for protecting one surface of the polarizing plate.

Figure 2:
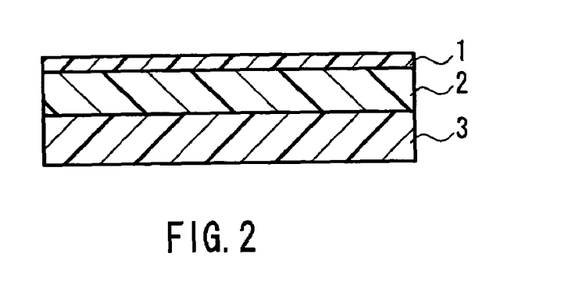
FIG. 2 is a schematic cross-sectional view showing an example of a laminated polarizing plate according to the present invention.

FIG. 2 shows an example of a configuration of a laminated polarizing plate including an optical film of the present invention and a polarizer. As shown in FIG. 2, in this laminated polarizing plate, a polarizer (2) is arranged between an optical film (1) and a protective film (3).

Figure 3:
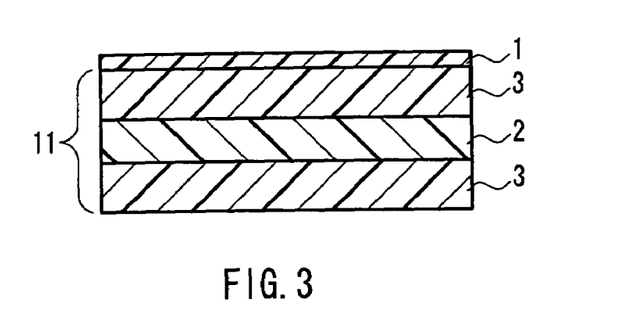
FIG. 3 is a schematic cross-sectional view showing another example of a laminated polarizing plate according to the present invention.

FIG. 3 shows an example of a configuration of a laminated polarizing plate including an optical film of the present invention, a polarizer, and two protective films. As shown in FIG. 3, protective films (3) are arranged on the respective surfaces of a polarizer (2), thus forming a polarizing plate (11), and an optical film of the present invention further is arranged on one of the protective films (3).

The adhesive (pressure-sensitive adhesive) used for lamination is not particularly limited, and any suitable adhesives such as transparent pressure-sensitive adhesives based on acrylic substances, silicone, polyester, polyurethane, polyether, and rubbers can be used. In order to prevent optical characteristics of the optical film and the like from changing, adhesives that do not require a process at high temperature when hardening or drying them are preferable, and those do not require a long period for a hardening or drying treatment are desirable. Also, it is preferable to use an adhesive that does not cause the optical film to be peeled off under a heating or humidifying condition, for example.

As described above, the optical film of the present invention may be used in combination with various retardation plates, diffusion-control films, brightness-enhancement films, and the like. Examples of the retardation plates include those obtained by uniaxially or biaxially stretching a p those subjected to a treatment for causing Z-axis alignment, and those obtained by applying a liquid crystal polymer. Examples of the diffusion-control films include films that control viewing angles by utilizing diffusion, scattering, and refraction and films that control glaring, scattered light, and the like that affect the resolution by utilizing diffusion, scattering, and refraction. Examples of the brightness-enhancement films include brightness-enhancement films utilizing the selective reflection property of a cholesteric liquid crystal and provided with a λ/4 plate and scattering films utilizing an anisotropic scatter depending on the polarization direction. Also, the optical film may be used in combination with a wire grid polarizer.

The laminated polarizing plate of the present invention can be used suitably for forming various liquid crystal displays, for example. When using the laminated polarizing plate in a liquid crystal display or the like, one or more other optical layers such as a reflection plate, a semitransparent reflection plate, and a brightness-enhancement film can be laminated additionally as required via an adhesive layer or a pressure-sensitive adhesive layer.

First, an example of a reflective polarizing plate or a semitransparent reflective polarizing plate will be described. The reflective polarizing plate is prepared by laminating further a reflection plate on a laminated polarizing plate according to the present invention, and the semitransparent reflective polarizing plate is prepared by laminating a semitransparent reflection plate on a laminated polarizing plate according to the present invention.

In general, the reflective polarizing plate is arranged on a backside of a liquid crystal cell in order to make a liquid crystal display (reflective liquid crystal display) that reflects incident light from a visible side (display side). The reflective polarizing plate is advantageous in that, for example, it allows the liquid crystal display to be thinned further because the necessity of providing a light source such as a backlight can be eliminated.

The reflective polarizing plate can be formed in any known manner such as forming a reflection plate of metal or the like on one surface of a polarizing plate having a certain elastic modulus. More specifically, one example thereof is a reflective polarizing plate formed by matting one surface (surface to be exposed) of a transparent protective layer of the polarizing plate as required, and providing the surface with a deposited film or a metal foil formed of a reflective metal such as aluminum.

Another example is a reflective polarizing plate prepared by forming, on a transparent protective layer having a surface with microscopic asperities due to microparticles contained in various transparent resins, a reflection plate corresponding to the microscopic asperities. The reflection plate having a surface with microscopic asperities diffuses incident light irregularly so that directivity and glare can be prevented and irregularity in color tones can be controlled. The reflection plate can be formed by attaching the metal foil or the metal deposited film directly on the surface with asperities of the transparent protective layer by any conventionally known methods including deposition and plating, such as vacuum deposition, ion plating, and sputtering.

As mentioned above, the reflection plate can be formed directly on a transparent protective layer of a polarizing plate. Alternatively, a reflecting sheet or the like formed by providing a reflecting layer on a proper film such as the transparent protective film can be used as the reflection plate. Since a typical reflecting layer of a reflection plate is made of a metal, it is preferably used in a state that the reflecting surface of the reflecting layer is coated with the film, a polarizing plate, or the like, in order to prevent a reduction of the reflectance due to oxidation, and furthermore, to allow the initial reflectance to be maintained for a long period and to avoid the necessity of forming a transparent protective layer separately.

On the other hand, the semitransparent polarizing plate is provided by replacing the reflection plate in the above-mentioned reflective polarizing plate by a semitransparent reflection plate. Examples of a semitransparent polarizing plate include a half mirror that reflects and transmits light at the reflecting layer.

In general, such a semitransparent polarizing plate is arranged on a backside of a liquid crystal cell. In a liquid crystal display including the semitransparent polarizing plate, incident light from the visible side (display side) is reflected to display an image when a liquid crystal display is used in a relatively bright atmosphere, while in a relatively dark atmosphere, an image is displayed by using a built-in light source such as a backlight on the backside of the semitransparent polarizing plate. In other words, the semitransparent polarizing plate can be used to form a liquid crystal display that can save energy for a light source such as a backlight under a bright atmosphere, while a built-in light source can be used under a relatively dark atmosphere.

The following description is about an example of an optical film, a laminated polarizing plate, or the like prepared by further laminating a brightness-enhancement film on the optical film, the laminated polarizing plate, or the like according to the present invention.

A suitable example of the brightness-enhancement film is not particularly limited, but it can be selected from a multilayer thin film of a dielectric or a laminate of multiple thin films with varied refraction aeolotropy that transmits linearly polarized light having a predetermined polarization axis while reflecting other light. Examples of such a brightness-enhancement film include "D-BEF (trade name)" manufactured by 3M Co. Also, a cholesteric liquid crystal layer, more specifically, an alignment film of a cholesteric liquid crystal polymer or an alignment liquid crystal layer fixed onto a supportive film base can be used as a brightness-enhancement film. Such a brightness-enhancement film reflects either clockwise or counterclockwise circularly polarized light while it transmits other light. Examples of such a brightness-enhancement film include "PCF 350 (trade name)" manufactured by Nitto Denko Corporation, "Transmax (trade name)" manufactured by Merck and Co., Inc., and the like.

An optical member including a laminate of at least two the above-mentioned optical layers can be formed, for example, by a method of laminating layers separately in a certain order in the process for manufacturing a liquid crystal display or the like. However, efficiency in manufacturing a liquid crystal display or the like can be improved by using an optical member that has been laminated previously because of its excellent stability in quality, assembling operability, and the like. Any appropriate adhesion means such as a pressure-sensitive adhesive layer can be used for lamination as in the above.

Moreover, it is preferable that the optical film, the laminated polarizing plate, or the like according to the present invention further has a pressure-sensitive adhesive layer or an adhesive layer so as to allow easier lamination onto the other members such as a liquid crystal cell. They can be arranged on one surface or both surfaces of the optical film, the laminated polarizing plate, or the like. The material for the pressure-sensitive adhesive layer is not particularly limited but can be a conventionally known material such as acrylic polymers. In particular, the pressure-sensitive adhesive layer having a low moisture absorption coefficient and an excellent thermal resistance is preferable from the aspects of prevention of foaming or peeling caused by moisture absorption, prevention of degradation in the optical characteristics and warping of a liquid crystal cell caused by difference in thermal expansion coefficients, a capability of forming a liquid crystal display with high quality and excellent durability, and the like. It also may be possible to incorporate fine particles so as to form the pressure-sensitive adhesive layer showing light diffusion property. For the purpose of forming the pressure-sensitive adhesive layer on the surface of the optical film, the laminated polarizing plate, or the like, a solution or melt of a sticking material can be applied directly on a predetermined surface of the optical film, the laminated polarizing plate, or the like by a development method such as flow-expansion and coating. Alternatively, a pressure-sensitive adhesive layer can be formed on a separator, which will be described below, in the same manner and transferred to a predetermined surface of the optical film, the laminated polarizing plate, or the like.

In the case where a surface of a pressure-sensitive adhesive layer or an adhesive layer provided on the optical film, the laminated polarizing plate, or the like is exposed, it is preferable to cover the surface with a separator tentatively so as to prevent contamination until the pressure-sensitive adhesive layer or the adhesive layer is put to use. The separator can be made of a suitable film, e.g., the above-mentioned transparent protective film, coated with a peeling agent if required. The peeling agent may be selected, for example, from a silicone-based agent, a long-chain alkyl-based agent, a fluorine-based agent, an agent containing molybdenum sulfide, and the like.

The respective layers such as the polarizer, the transparent protective layer, the pressure-sensitive adhesive layer, or the adhesive layer for composing the optical film or the laminated polarizing plate according to the present invention may be subjected to a suitable treatment such as a treatment with an UV absorber, e.g., salicylate ester compounds, benzophenone compounds, benzotriazole compounds, cyanoacrylate compounds, or nickel complex salt-based compounds, thus providing an UV absorbing capability.

The optical film and the laminated polarizing plate according to the present invention can be used preferably for forming various devices such as liquid crystal displays. For example, a polarizing plate can be arranged on at least one surface of a liquid crystal cell so as to be applied to, for example, a reflection-type, semi-transmission-type, or transmission and reflection type liquid crystal display. A liquid crystal cell to compose the liquid crystal display can be selected arbitrarily. For example, it is possible to use liquid crystal cells of appropriate types such as active matrix driving type represented by a thin film transistor type, a simple matrix driving type represented by a twist nematic type and a super twist nematic type.

Examples of the liquid crystal cell include STN (Super Twisted Nematic) cells, TN (Twisted Nematic) cells, IPS (In-Plane Switching) cells, VA (Vertical Aligned) cells, OCB (Optically Aligned Birefringence) cells, HAN (Hybrid Aligned Nematic) cells, ASM (Axially Symmetric Aligned Microcell) cells, ferroelectric cells, and antiferroelectric cells. The cells may be subjected to an alignment-division systematically or randomly. The birefringent layer according to the present invention is excellent particularly in optical compensation of VA (Vertical Aligned) cells.

Figure 4:
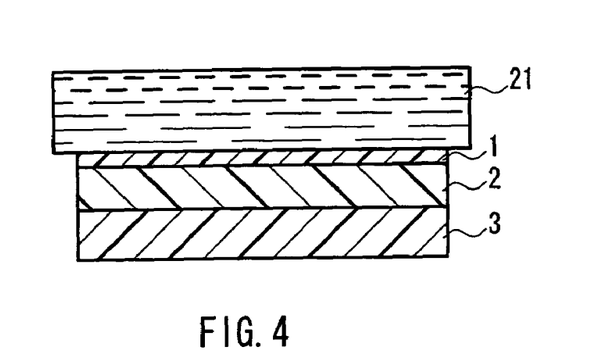
FIG. 4 is a schematic cross-sectional view showing an example of a liquid crystal display according to the present invention.

FIG. 4 shows an example of a liquid crystal display including an optical film according to the present invention, a liquid crystal cell, a polarizer, and a protective film. As shown in FIG. 4, an optical film (1) of the present invention is arranged between a liquid crystal cell (21) and a polarizer (2). On the surface of the polarizer (2) other than the surface in contact with the optical film, a protective film (3) is arranged.

Since the optical film according to the present invention are excellent particularly in optical compensation of a VA (Vertical Aligned) cell, they are most suitably used for viewing-angle compensating films for VA mode liquid crystal displays.

In general, a typical liquid crystal cell is composed of opposing liquid crystal cell substrates and a liquid crystal injected into a space between the substrates. The liquid crystal cell substrates can be made of glass, plastics, or the like without any particular limitations. Materials for the plastic substrates can be selected from conventionally known materials without any particular limitations.

When polarizing plates or optical members are arranged on both sides of a liquid crystal cell, the polarizing plates or the optical members on the surfaces can be the same or different type. Moreover, for forming a liquid crystal display, one or more layers of appropriate members such as a prism array sheet, a lens array sheet, an optical diffuser, and a backlight can be arranged at proper positions.

The optical film (birefringence film) and the laminated polarizing plate according to the present invention can be used not only in the above-described liquid crystal displays but also in, for example, self-light-emitting displays such as organic electroluminescence (EL) displays, plasma displays (PD) and field emission displays (FED). When the optical film or the laminated polarizing plate of the present invention is used in a self-light-emitting flat display, the optical film or the laminated polarizing plate can be used as an antireflection filter because circularly polarized light can be obtained by setting the in-plane retardation value And of the birefringent layer included in the optical film to λ/4, for example.

The following is a specific description of an electroluminescence (EL) display including a laminated polarizing plate according to the present invention. The EL display of the present invention is a display having an optical film or a laminated polarizing plate according to the present invention, and can be either an organic EL display or an inorganic EL display.

In recent EL displays, for preventing reflection from an electrode in a black state, use of an optical film such as a polarizer and a polarizing plate as well as a λ/4 plate is proposed. The laminated polarizing plate and the optical film according to the present invention are especially useful when linearly polarized light, circularly polarized light, or elliptically polarized light is emitted from an EL layer. The polarizing plate with optical compensation function according to the present invention is especially useful even when an oblique light beam is partially polarized even in the case where natural light is emitted in a front direction.

First, a typical organic EL display will be explained below. In general, such an organic EL display has a ruminant (organic EL luminant) that is prepared by laminating a transparent electrode, an organic luminant layer, and a metal electrode in this order on a transparent substrate. Here, the organic luminant layer is a laminate of various organic thin films. Examples thereof include various combinations such as a laminate of a hole injection layer made of a triphenylamine derivative or the like and a ruminant layer made of a phosphorous organic solid such as anthracene; a laminate of the ruminant layer and an electron injection layer made of a perylene derivative or the like; and a laminate of the hole injection layer, the luminant layer, and the electron injection layer.

In general, the organic EL display emits light on the following principle: a voltage is applied to the anode and the cathode so as to inject holes and electrons into the organic ruminant layer, energy generated by the re-bonding of these holes and electrons excites the phosphor, and the excited phosphor emits light when it returns to the basis state. The mechanism of the re-bonding of these holes and electrons during the process is similar to that of an ordinary diode. This implies that current and the light emitting intensity exhibit a considerable nonlinearity accompanied with a rectification with respect to the applied voltage.

It is preferred for the organic EL display that at least one of the electrodes is transparent so as to obtain luminescence at the organic ruminant layer. In general, a transparent electrode of a transparent conductive material such as indium tin oxide (ITO) is used for the anode. Use of substances having small work function for the cathode is important for facilitating the electron injection and thereby raising luminous efficiency, and in general, metal electrodes such as Mg—Ag and Al—Li can be used.

In an organic EL display configured as described above, it is preferable that the organic ruminant layer is made of a film that is extremely thin such as about 10 nm, so that the organic luminant layer can transmit substantially whole light as the transparent electrode does. As a result, when the layer does not illuminate, a light beam entering from the surface of the transparent substrate passes through the transparent electrode and the organic ruminant layer and is reflected at the metal electrode so that it comes out again to the surface of the transparent substrate. Thereby, the display surface of the organic EL display looks like a mirror when viewed from exterior.

In an organic EL display according to the present invention including an organic EL luminant having a transparent electrode on the surface side of an organic luminant layer and a metal electrode on the back surface of the organic luminant layer, for example, it is preferable that an optical film (a polarizing plate or the like) according to the present invention is arranged on the surface of the transparent electrode, and furthermore, a λ/4 plate is arranged between the polarizing plate and an EL element. As described above, an organic EL display obtained by arranging an optical film according to the present invention can suppress external reflection and improve the visibility. It is further preferable that a retardation plate is arranged between the transparent electrode and the optical film.

The retardation plate and the optical film (the polarizing plate or the like) polarize, for example, light which enters from outside and is reflected by the metal electrode, and thus the polarization has an effect that the mirror of the metal electrode cannot be viewed from exterior. Particularly, the mirror of the metal electrode can be blocked completely by forming the retardation plate with a quarter wavelength plate and adjusting an angle formed by the polarization directions of the retardation plate and the polarizing plate to be π/4. That is, the polarizing plate transmits only the linearly polarized light component among the external light entering the organic EL display. In general, the linearly polarized light is changed into elliptically polarized light by the retardation plate. When the retardation plate is a quarter wavelength plate and when the angle is π/4, the light is changed into circularly polarized light.

This circularly polarized light passes through, for example, the transparent substrate, the transparent electrode, and the organic thin film. After being reflected by the metal electrode, the light passes again through the organic thin film, the transparent electrode, and the transparent substrate, and turns into linearly polarized light at the retardation plate. Moreover, since the linearly polarized light crosses the polarization direction of the polarizing plate at a right angle, it cannot pass through the polarizing plate. Consequently, as described above, the mirror of the metal electrode can be blocked completely.

EXAMPLES

The following is a more specific description of the present invention by way of examples and comparative examples, though the present invention is by no means limited to the examples below. The characteristics of optical films are evaluated in the following manner.

The retardation was measured using a retardation meter (manufactured by Oji Scientific Instruments, trade name: KOBRA 21ADH).

The refractive index at 590 nm was measured using a retardation meter (manufactured by Oji Scientific Instruments, trade name: KOBRA 21ADH).

The film thickness was measured using a digital micrometer K-351C manufactured by Anritsu Corporation.

The viscosity of solutions was measured using a rheometer (manufactured by Thermo Haake GmbH). The measurement temperature was 25° C.

Example 1

Polyimide having a weight-average molecular weight (Mw) of 110,000 was first synthesized from 2,2'-bis(3,4-dicarboxyphenyl)hexafluoropropane (6FDA) and 2,2'-bis(trifluoromethyl)-4,4'-diaminobiphenyl (PFMBTFMB) and then dissolved in cyclohexanone to prepare a 15 wt % solution of this polyimide. The thus-obtained polyimide solution was applied onto a 75 μm thick triacetylcellulose (TAC) film (transparent polymer film) prepared by stretching a TAC film to 1.3 times its original length at 175° C. by fixed-end transverse stretching. Thereafter, the film having a layer of the polyimide solution was heat-treated at 100° C. for 10 minutes, thus forming a completely transparent and smooth birefringent layer (a) (polyimide film) having a thickness of 6 μm on the TAC film. In this manner, an optical film was obtained. The birefringent layer (a) of this optical film exhibited optical characteristics satisfying nx>ny>nz.

Example 2

Polyaryletherketone A (trade name) (manufactured by Nippon Shokubai Co., Ltd.) represented by the above formula (18) and having a molecular weight of 200,000 was dissolved in methyl isobutyl ketone to prepare a 20 wt % solution of the Polyaryletherketone A. The thus-obtained polyaryletherketone solution was applied onto a 75 μm thick triacetylcellulose (TAC) film (transparent polymer film) prepared by stretching a TAC film to 1.3 times its original length at 175° C. by fixed-end transverse stretching. Thereafter, the film having a layer of the polyaryletherketone solution was heat-treated at 100° C. for 10 minutes, thus forming a completely transparent and smooth birefringent layer (a) having a thickness of 10 μm on the TAC film. In this manner, an optical film was obtained. The birefringent layer (a) of this optical film exhibited optical characteristics satisfying nx>ny>nz.

Example 3

The same polyimide solution as in Example 1 was applied onto a TAC film (transparent polymer film). Thereafter, the film having a layer of the polyimide solution was heat-treated at 100° C. for 10 minutes, thus forming a completely transparent and smooth birefringent layer (a) having a thickness of 4.2 μm on the TAC film. The thus-obtained laminate of the birefringent layer (a) and the TAC film was stretched 10% at 150° C. by uniaxial-longitudinal stretching. In this manner, an optical film was obtained. The optical film has a thickness of 4 μm and the birefringent layer (a) of this optical film exhibited optical characteristics satisfying nx>ny>nz.

Example 4

Polyimide having a Mw of 30,000 was first synthesized from 4,4'-bis(3,4-dicarboxyphenyl)-2,2-diphenylpropane dianhydride and 2,2'-dichloro-4,4'-diaminobiphenyl and then dissolved in cyclopentanone to prepare a 20 wt % solution of this polyimide. The thus-obtained polyimide solution was applied onto a TAC film (transparent polymer film). Thereafter, the film having a layer of the polyimide solution was heat-treated at 130° C. for 5 minutes and then stretched 10% at 150° C., thus forming a transparent and smooth birefringent layer (a) having a thickness of 5 μm on the TAC film. In this manner, an optical film was obtained. The birefringent layer (a) of this optical film exhibited optical characteristics satisfying nx>ny>nz.

Example 5

Polyimide having a Mw of 100,000 was first synthesized from 2,2'-bis(3,4-dicarboxyphenyl)hexafluoropropane and 2,2'-bis(trifluoromethyl)-4,4'-diaminobiphenyl and then dissolved in cyclohexanone to prepare a 15 wt % solution of this polyimide. The thus-obtained polyimide solution was applied onto a TAC film (transparent polymer film). Thereafter, the film having a layer of the polyimide solution was heat-treated at 150° C. for 5 minutes and then stretched 10% at 150° C., thus obtaining a completely transparent and smooth birefringent layer (a) having a thickness of 6 μm on the TAC film. The laminate of the birefringent layer (a) and the TAC film was an optical film having the birefringent layer that exhibits optical characteristics satisfying nx>ny>nz.

Example 6

First, a solution having a solid content of 15 wt % was prepared by dissolving in methylene chloride 75 weight parts of an alternating copolymer of isobutene and N-methyl maleimide (a content of N-methyl maleimide was 50 mol %) and 25 weight parts of acrylonitrile-styrene copolymer in which a content of acrylonitrile was 28 wt %. This solution was flow-expanded on a polyethylene terephthalate (PET) film arranged on a glass sheet, and left at room temperature for 60 minutes so that the solution hardened to form a film. The film was then peeled off from the PET film and heat-treated at 100° C. for 10 minutes. Subsequently, the film was further heat-treated at 140° C. for 10 minutes and at 160° C. for 30 minutes, thus obtaining a transparent polymer film. This film had an in-plane retardation (Δnd) of 4 nm, Rth of 4 nm, and a birefringence (Δn(b)) of 0.0001.

The same polyimide solution as in Example 1 was applied onto the thus-obtained transparent polymer film. Thereafter, the film having a layer of the polyimide solution was heat-treated at 100° C. for 5 minutes, thus forming a completely transparent and smooth birefringent layer (a) having a thickness of 6.2 μm on the transparent polymer film. The thus-obtained laminate of the birefringent layer (a) and the transparent polymer film was stretched 10% at 130° C. by uniaxial-longitudinal stretching. In this manner, an optical film was obtained. The birefringent layer (a) of this optical film has a thickness of 6 μm and exhibited optical characteristics satisfying Δn(a)=about 0.035 and nx>ny>nz.

Example 7

The same polyimide as in Example 1 was dissolved in methyl isobutyl ketone to prepare a 25 wt % solution of this polyimide. The polyimide solution was applied onto a TAC film (transparent polymer film). Thereafter, the film having a layer of the polyimide solution was heat-treated at 160° C. for 5 minutes, thus forming a completely transparent and smooth birefringent layer (a) having a thickness of 6 μm on the TAC film. In this manner, an optical film was obtained. The birefringent layer (a) of this optical film exhibited optical characteristics satisfying nx>ny>nz.

Example 8

The same polyimide solution as in Example 1 was applied onto a TAC film (transparent polymer film). Thereafter, the film having a layer of the polyimide solution was heat-treated at 100° C. for 10 minutes, thus forming a completely transparent and smooth birefringent layer (a) having a thickness of 6 µm on the TAC film. In this manner, an optical film was obtained. The birefringent layer (a) of this optical film exhibited optical characteristics satisfying nx≈ny>nz.

Comparative Example 1

Polyimide having a weight-average molecular weight (Mw) of 8,000 was first synthesized from 2,2'-bis(3,4-dicarboxyphenyl)hexafluoropropane (6FDA) and 2,2'-bis(trifluoromethyl)-4,4'-diaminobiphenyl (PFMBTFMB) and then dissolved in cyclohexanone to prepare a 15 wt % solution of this polyimide. The thus-obtained polyimide solution was applied onto an 80 µm thick triacetylcellulose (TAC) film (transparent polymer film) prepared by stretching a TAC film to 1.2 times its original length at 150° C. by longitudinal stretching. Thereafter, the film having a layer of the polyimide solution was heat-treated at 150° C. for 10 minutes, thus forming a completely transparent and smooth birefringent layer (a) (polyimide film) having a thickness of 6 µm on the TAC film. In this manner, an optical film was obtained. The thus-obtained optical film having the birefringent layer (a) is an optical film having a birefringent layer (a) satisfying nx>ny>nz.

Comparative Example 2

A norbornene-based resin film (manufactured by JSR Corporation, trade name: ARTON film) was stretched to 1.3 times its original length at 150° C. by fixed-end transverse stretching, thus obtaining an 80 µm thick optical film. This film exhibited optical characteristics satisfying nx>ny>nz. The polymer forming the norbornene-based resin film had a weight-average molecular weight of 60,000.

Comparative Example 3

A 75 µm thick PET film was prepared by stretching a PET film to 1.3 times its original length at 175° C. by fixed-end transverse stretching, and the same polyimide solution as in Example 1 was applied onto this PET film. Thereafter, the film having a layer of the polyimide solution was dried at 150° C. for 5 minutes, thus forming a completely transparent and smooth birefringent layer (a) having a thickness of 6 µm on the PET film. In this manner, an optical film was obtained. The birefringent layer (a) of this optical film exhibited optical characteristics satisfying nx>ny>nz.

Comparative Example 4

Polyetherketone (Mw: 500,000) represented by the above formula (18) was dissolved in cyclopentanone to prepare a 25 wt % solution of the polyetherketone. On the other hand, an 80 µm thick triacetylcellulose (TAC) film was stretched to 1.3 times its original length at 175° C. by fixed-end transverse stretching, thus preparing a 75 µm thick TAC film. The above-described polyetherketone solution was applied onto the stretched TAC film. Thereafter, the stretched TAC film having a layer of the polyetherketone solution was heat-treated at 100° C. for 10 minutes, thus forming a completely transparent and smooth birefringent layer (a) having a thickness of 75 µm on the stretched TAC film. In this manner, an optical film was obtained. The birefringent layer (a) of this optical film exhibited optical characteristics satisfying nx>ny>nz. Owing to a large molecular weight of the polyetherketone, it was difficult to apply the polyetherketone solution uniformly onto the stretched TAC film. As a result, the retardation varied depending on a portion of the birefringent layer (a). In addition, the polyetherketone was not dissolved in cyclopentanone completely, resulting in a poor appearance.

(Evaluation of Optical Films)

With regard to the optical films obtained in Examples 1 to 8 and Comparative Examples 1 to 4, the values of Δn(a), Δn(b), (nx−ny)×d, (nx−nz)×d, and (nx−nz)/(nx−ny) were calculated from the values of nx, ny, and nz. The results are shown in Table 1.

Also, the viscosity of the polyimide solutions applied in Examples 1 to 8 and Comparative Examples 1 and 2 to 4 and the thickness of the respective birefringent layers (a) in the respective examples and comparative examples are shown in Table 1.

The optical films obtained in Examples 1 to 8 and Comparative Examples 1 to 4 were stored in a dryer at 100° C. for 100 hours, and the long-term storage stability of the respective optical films was evaluated. The results of the evaluation are shown in Table 1, where "Bad" means that cracks occurred, while "Good" means that no cracks occurred.

Furthermore, the results of the evaluation on the coating accuracy of the optical films obtained in Examples 1 to 8 and Comparative Examples 1 to 4 also are shown in Table 1. In Table 1, "Good" means that the solution could be applied uniformly, thus causing no variation in the retardation, while "Bad" means that it was difficult to apply the solution uniformly so that the retardation varied depending on a portion of the birefringent layer (a).

TABLE 1

|  | Δn(b) | Mw of polymer | Viscosity of polymer solution [Pa·s] | Δn(a) | (nx − ny)·d [nm] | (nx − nz)·d [nm] | (nx − nz)/(nx − ny) [nm] | Thickness of birefringent layer (a) [µm] | Long-term storage stability | Coating accuracy | iridescence |
|---|---|---|---|---|---|---|---|---|---|---|---|
| Ex. 1 | 0.0006 | 110,000 | 1 | 0.045 | 135 | 270 | 2.0 | 6 | Good | Good | none |
| Ex. 2 | 0.0006 | 200,000 | 8 | 0.018 | 50 | 180 | 3.6 | 10 | Good | Good | none |
| Ex. 3 | 0.0006 | 110,000 | 1 | 0.038 | 100 | 150 | 1.5 | 4 | Good | Good | none |
| Ex. 4 | 0.0006 | 30,000 | 1.5 | 0.025 | 50 | 125 | 2.5 | 5 | Good | Good | none |
| Ex. 5 | 0.0006 | 100,000 | 1 | 0.039 | 100 | 235 | 2.4 | 6 | Good | Good | none |
| Ex. 6 | 0.0001 | 110,000 | 1 | 0.035 | 80 | 210 | 2.6 | 6 | Good | Good | none |
| Ex. 7 | 0.0006 | 110,000 | 12 | 0.038 | 70 | 230 | 3.3 | 6 | Good | Good | none |
| Ex. 8 | 0.0006 | 110,000 | 1 | 0.037 | 0.2 | 220 | 1100.0 | 6 | Good | Good | none |
| Com. Ex. 1 | 0.0006 | 8,000 | 0.5 | 0.030 | 60 | 180 | 3.0 | 6 | Bad | Good | none |
| Com. | 0.0006 | — | — | 0.002 | 91 | 182 | 2.0 | 80 | Good | — | none |

TABLE 1-continued

| | Δn(b) | Mw of polymer | Viscosity of polymer solution [Pa · s] | Δn(a) | (nx − ny) · d [nm] | (nx − nz) · d [nm] | (nx − nz)/ (nx − ny) [nm] | Thickness of birefringent layer (a) [μm] | Long-term storage stability | Coating accuracy | iridescence |
|---|---|---|---|---|---|---|---|---|---|---|---|
| Ex. 2 Com. Ex. 3 | 0.08 | 110,000 | 8 | 0.042 | 50 | 250 | 5.0 | 6 | Good | Good | observed |
| Com. Ex. 4 | 0.0006 | 500,000 | 15 | 0.020 | 10 | 200 | 20 | 10 | Good | Bad | none |

As becomes clear from Table 1, the optical films of the respective examples satisfied the above formulae (1) to (3) and the molecular weights of the polymers forming the respective birefringent layers (a) were in the range between 10,000 and 400,000 inclusive, thereby allowing variations in retardation of the optical films to be suppressed.

Moreover, the viscosities of the polymer solutions used for forming the birefringent layers (a) in the respective examples were not too high, and the optical films obtained were excellent in long-term storage stability.

(Evaluation of Liquid Crystal Displays Including Optical Films)

To each of the optical films obtained in Examples 1 to 7 and Comparative Examples 1 to 5, a polarizing plate (manufactured by Nitto Denko Corporation, trade name: HEG1425DU) was attached with a pressure-sensitive acrylic adhesive. Thus, twelve types of laminated polarizing plates were obtained. Each of these laminated polarizing plates was attached on a backlight side of a liquid crystal cell with an acrylic adhesive so that the optical film faced the liquid crystal cell. In this manner, liquid crystal displays were produced.

The display characteristics of these liquid crystal displays were examined. The presence or absence of iridescence is shown in Table 1 above. As shown in Table 1, iridescence was not observed in the optical films according to the respective examples.

INDUSTRIAL APPLICABILITY

As specifically described above, an optical film according to the present invention can prevent the occurrence of iridescence, suppresses variation in retardation and a poor appearance, and has excellent long-term storage stability. As a result, by using the optical film of the present invention in, for example, a liquid crystal display, it is possible to improve a display quality over a long period.

The invention claimed is:

1. An optical film comprising:
   a transparent polymer film (b); and
   a biaxially birefringent layer (a) formed of a polymer and laminated above the transparent polymer film (b),
   wherein the birefringent layer (a) and the transparent polymer film (b) satisfy a formula (1) below,
   the birefringent layer (a) satisfies formulae (2) and (3) below, and
   the polymer forming the birefringent layer (a) has a weight-average molecular weight in a range between 10,000 and 400,000 inclusive, $$\Delta n(a) > \Delta n(b) \times 10 \quad (1)$$

$$1 < (nx-nz)/(nx-ny) < 100 \quad (2)$$

$$0.0005 \leq \Delta n(a) \leq 0.5 \quad (3)$$

where $\Delta n(a)$ is a birefringence of the birefringent layer (a) and is represented by $[(nx+ny)/2]-nz$, $\Delta n(b)$ is a birefringence of the transparent polymer film (b) and is represented by $[(nx'+ny')/2]-nz'$, nx, ny, and nz represent refractive indices in an X-axis direction, a Y-axis direction, and a Z-axis direction in the birefringent layer (a), respectively, with the X-axis direction being an axial direction exhibiting a maximum refractive index within a plane of the birefringent layer (a), the Y-axis direction being an axial direction perpendicular to the X-axis within the plane, and the Z-axis direction being a thickness direction perpendicular to the X-axis and the Y-axis, and nx', ny', and nz' represent refractive indices in an X-axis direction, a Y-axis direction, and a Z-axis direction in the transparent polymer film (b), respectively, with the X-axis direction being an axial direction exhibiting a maximum refractive index within a plane of the transparent polymer film (b), the Y-axis direction being an axial direction perpendicular to the X-axis within the plane, the Z-axis direction being a thickness direction perpendicular to the X-axis and the Y-axis.

2. The optical film according to claim 1, wherein the birefringent layer (a) is laminated directly on the transparent polymer film (b).

3. The optical film according to claim 1, wherein the polymer forming the birefringent layer (a) is a non-liquid crystalline polymer.

4. The optical film according to claim 3, wherein the non-liquid crystalline polymer is at least one polymer selected from the group consisting of polyamide, polyimide, polyester, polyetherketone, polyaryletherketone, polyamide imide, and polyesterimide.

5. The optical film according to claim 1, wherein the transparent polymer film (b) is a protective film for a polarizer.

6. A laminated polarizing plate comprising an optical film, wherein the optical film is the optical film according to claim 1.

7. A liquid crystal panel comprising a liquid crystal cell and an optical member, the optical member being arranged on at least one surface of the liquid crystal cell, wherein the optical member is the laminated polarizing plate according to claim 6.

8. A liquid crystal display comprising a liquid crystal panel, wherein the liquid crystal panel is the liquid crystal panel according to claim 7.

9. A self-light-emitting display comprising the laminated polarizing plate according to claim 6.

10. A display comprising the laminated polarizing plate according to claim 6.

11. The laminated polarizing plate according to claim 6, wherein the transparent polymer film (b) is a protective film for a polarizer.

12. A liquid crystal panel comprising a liquid crystal cell and an optical member, the optical member being arranged on at least one surface of the liquid crystal cell, wherein the optical member is the optical film according to claim 1.

13. A liquid crystal display comprising a liquid crystal panel, wherein the liquid crystal panel is the liquid crystal panel according to claim 12.

14. A self-light-emitting display comprising the optical film according to claim 1.

15. A display comprising the optical film according to claim 1.

16. An optical element comprising the optical film of claim 1 and a birefringent film.

17. The optical film according to claim 1, wherein $(nx-nz)/(nx-ny) \leqq 80$.

18. The optical film according to claim 1, wherein $(nx-nz)/(nx-ny) \leqq 50$.

19. The optical film according to claim 1, wherein $(nx-nz)/(nx-ny) \leqq 30$.

* * * * *